(12) United States Patent  (10) Patent No.: US 9,102,430 B2
Monti  (45) Date of Patent: Aug. 11, 2015

(54) METHOD FOR REMOVING A SEALING FILM FROM A CONTAINER AND A DEVICE FOR ACTUATING THE METHOD

(71) Applicant: Marchesini Group S.p.A, Pianoro Bologna (IT)

(72) Inventor: Giuseppe Monti, Pianoro Bologna (IT)

(73) Assignee: MARCHESINI GROUP S.p.A., Pianoro Bologna (IT)

( * ) Notice: Subject to any disclaimer, the term of this patent is extended or adjusted under 35 U.S.C. 154(b) by 85 days.

(21) Appl. No.: 14/060,046

(22) Filed: Oct. 22, 2013

(65) Prior Publication Data
US 2014/0174041 A1  Jun. 26, 2014

(30) Foreign Application Priority Data
Oct. 25, 2012 (IT) ............................. BO2012A0581

(51) Int. Cl.
*B32B 38/10* (2006.01)
*B65B 69/00* (2006.01)
*B32B 43/00* (2006.01)
*B67B 7/40* (2006.01)

(52) U.S. Cl.
CPC ........... *B65B 69/0033* (2013.01); *B32B 43/006* (2013.01); *B65B 69/00* (2013.01); *B67B 7/40* (2013.01); *Y10T 156/1168* (2015.01); *Y10T 156/1989* (2015.01)

(58) Field of Classification Search
CPC .. B32B 43/006; B32B 69/00; B32B 69/0033; B67B 7/40; Y10T 156/1168; Y10T 156/1978; Y10T 156/1989
See application file for complete search history.

(56) References Cited

U.S. PATENT DOCUMENTS

| | | | | |
|---|---|---|---|---|
| 2,674,309 A * | 4/1954 | Bigelow | ......................... | 156/763 |
| 3,929,555 A * | 12/1975 | Sanders | ......................... | 156/764 |
| 4,685,991 A * | 8/1987 | Herrmann et al. | ............ | 156/701 |
| 4,828,640 A * | 5/1989 | Kaya et al. | .................... | 156/248 |
| 4,956,044 A * | 9/1990 | Watanabe et al. | ............. | 156/350 |
| 5,466,330 A * | 11/1995 | Sakai et al. | ................... | 156/766 |
| 5,481,946 A * | 1/1996 | Nishikawa et al. | ............. | 81/3.2 |
| 5,676,789 A * | 10/1997 | Hamamura | .................... | 156/714 |
| 6,227,276 B1 * | 5/2001 | Kim et al. | ..................... | 156/763 |
| 6,503,130 B2 * | 1/2003 | Lim | ............................. | 451/285 |

(Continued)

FOREIGN PATENT DOCUMENTS

| | | |
|---|---|---|
| DE | 4419 475 A1 | 12/1995 |
| DE | 297 03 346 U1 | 2/1998 |

(Continued)

*Primary Examiner* — Mark A Osele
(74) *Attorney, Agent, or Firm* — R. Neil Sudol; Henry D. Coleman (57) ABSTRACT

The method for removing a sealing film from a container includes use of a gripping device having a fixed lower jaw and a mobile upper jaw and comprises carrying out following steps: a first gripping step, in which the gripping device clamps the flap of film projecting from a rounded corner of the container; a step of partial detachment, in which the gripping device detaches only a portion of the film which is at the rounded corner; an adjusting step in which the mobile upper jaw is distanced from the fixed lower jaw and the gripping device is moved so as to capture, between the two jaws, a larger surface of film; a second gripping step in which the upper jaw lowers and locks against the lower jaw to grip the surface of film, and a complete detaching step, in which the gripping device performs complete detachment of the film.

9 Claims, 8 Drawing Sheets

(56) References Cited

U.S. PATENT DOCUMENTS 7,207,241 B2 * 4/2007 Itoh .................................. 81/3.2
7,644,747 B2 * 1/2010 Ohkawara et al. ............ 156/764
2009/0208316 A1 * 8/2009 Mayer et al. .................. 414/729

FOREIGN PATENT DOCUMENTS

DE   10 2006 005700 A1   8/2007
WO   WO 2013166379 A1 *  11/2013

* cited by examiner

METHOD FOR REMOVING A SEALING FILM FROM A CONTAINER AND A DEVICE FOR ACTUATING THE METHOD

FIELD OF THE INVENTION

The present invention concerns the particular technical sector relating to sterile packing of articles usable in the pharmaceutical field internally of relative containers, which are then closed and sealed hermetically by a sealing film.

DESCRIPTION OF THE PRIOR ART

In more detail, the present invention relates to a method and a device able to actuate this method, so as to remove the sealing film from the container.

In this particular technical sector the articles destined to contain substances or products of a pharmaceutical type, such as for example syringes, are predisposed, in aseptic and sterile conditions, internally of containers which are then closed and hermetically sealed by application of a sealing film, then to be transported to the place where the articles will be filled with the pharmaceutical substance or, in the case that they are already filled, where the final packing operations will be carried out.

The containers used for this purpose are usually conformed as a sort of tray, which in technical language is called a tab, having a polygonal shape, for example rectangular or square, which exhibits an upper edge folded towards the outside with, at the corners or edges thereof, is rounded and beveled.

The sealing film is shaped with a polygonal profile corresponding to the shape of the container (for example rectangular or square) and is applied and sealed, for example by heat-welding or gluing, on the upper folded edge of the container.

See FIGS. 1, 2, 2A and 2B for this, where a container (C) provided with the sealing film (P) is illustrated.

The sealing film (P) is shaped so that the dimensions thereof are slightly greater than those of the container (C) as it has to be heat-welded or glued on the upper folded edge (B) thereof.

Figures 1, 2A, 2B:
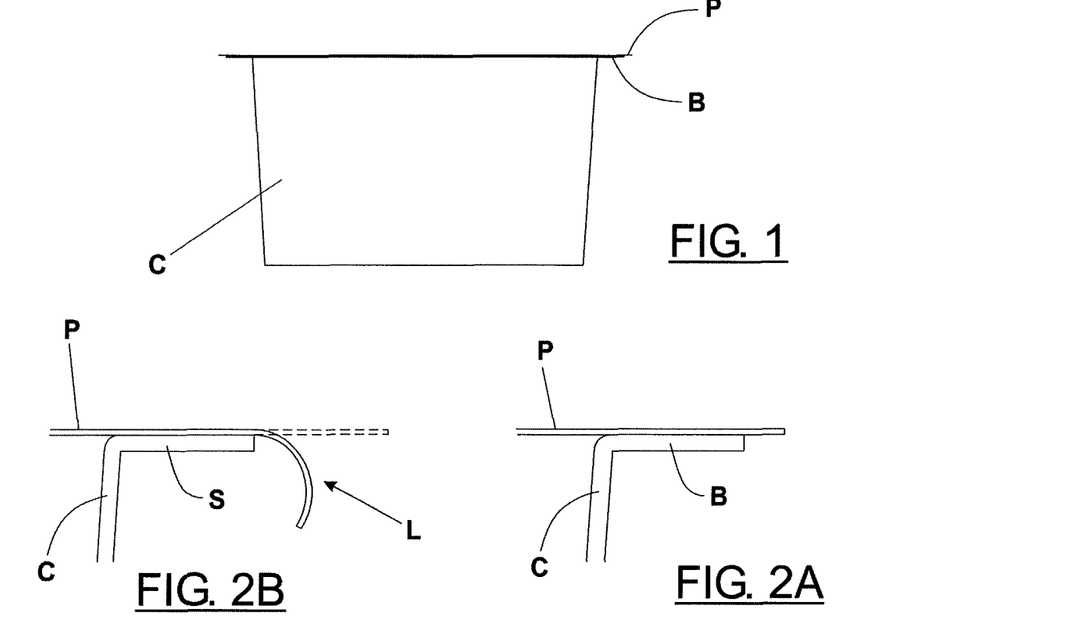

This however means that once the film (P) has been applied and sealed to the folded upper edge (B) of the container (C), at the rounded corners (S) thereof, due to the rounded shape of the corners (S) a portion or flap (L) of film (P) projects from the rounded corner (S) of the edge, by more than the portions of film that are instead located along the sides of the edge of the container (see for example in particular FIGS. 2A and 2B).

Further, it is not always possible to apply the sealing film in a perfectly centered position with respect to the container, and thus it can happen that at the rounded corners of the edge of the container a flap of film projects by a very small amount or, on the contrary, by quite a significant amount.

The methods at present used for removing the sealing film from the container include using gripping devices that are used to clamp the flap of film which projects from a rounded corner of the edge of the container and then raises and distances the film sharply from the container to as to detach it.

This mode of action however is not always effective as the portion or flap (L) of film, which projects from the rounded corner (S) of the edge of the container, is often folded or curled in a downwards direction (see in detail FIG. 2B), which compromises or makes very difficult the gripping thereof by the gripping device, or, as mentioned above, due to a not-perfect centering of the film, portion or flap of film which projects from the rounded corner which can be very small, making it impossible to grasp.

The downwards-folding or curling of the flap of film which projects from the rounded corners of the edge of the container is mainly due to the ways in which the container is maneuvered (usually it is predisposed internally of a protective bag, then to be extracted at the moment when the film is to be removed) or due to the operations to which it is subjected before the opening thereof (such as for example the sterilizing operations internally of autoclaves).

Document DE 44 19 475 discloses a gripping device which includes two jaws for gripping the flap of film projecting from a rounded corner of the edge of the container, wherein the lower jaw is mobile while the upper jaw is fixed.

This gripping device is commanded and moved in the following way.

The gripping device with the two jaws opened, i.e. with the lower jaw mobile and distanced and opened away from the upper jaw, is positioned at a point of a side of the edge of the container so that the fixed upper jaw is in contact with the film and the upper surface of the edge of the container.

After this, the mobile lower jaw is activated and neared to the upper jaw so as to clamp between the jaws both the film and the folded edge of the container.

The gripping device is then translated towards the rounded corner of the edge of the container and, when it has reached the edge, it is rotated in such a way as to align the two jaws to the bisector of the angle subtended to the corner.

In this way, once the jaws have been rotated and aligned to the bisector of the angle, between the jaws there is only the flap of film which projects from the corner, as the edge is rounded here.

After this, the lower jaw is activated and raised, as the body of the edge of the container is not there, so as to clamp against the upper fixed jaw and the gripping device is sharply raised and distanced from the corner, in a first movement direction directed towards the center, with the aim of proceeding with the detachment of the film from the whole edge of the container and thus completely removing it.

However, the use of a gripping device of this type, with the lower jaw mobile and the upper jaw fixed, and with the above-described activating and movement modes, has not in practice been shown to be particularly effective in those cases in which the flap of film projecting from the rounded corner of the edge of the container is very much curled and folded downwards, or when the film has not been applied and sealed perfectly centered with respect to the edge of the container and the flap of film projecting from the corner is extremely small.

In these cases, the flap of the film which is clamped between the two jaws when they have been rotated and positioned aligned to the bisector of the corner subtended to the corner is very small and when the gripping device is sharply raised and distanced from the corner towards the center of the container, the gripping device loses grip on the flap because as it can only act on this very small flap of the film it cannot overcome the resistance posed by the parts of film sealed on the entire edge of the container.

With the aim of preventing the loss of grip by the gripping device during the raising of the film, in document WO 2007/090690 creates a sort of pre-weakened line at a portion of the rounded corner of the edge of the container, and uses the gripping device in such a way that it grips both the film and the portion of corner.

In this way, between the two jaws of the gripping device there will be a greater surface of film, and therefore a better grip, but also a portion of the corner of the edge of the container: this means that when the gripping device is sharply raised and distanced it will break the portion of the corner of the edge of the container, and also remove the film.

This particular modality of proceeding by removing the film presents some drawbacks, however.

Firstly the container will be irredeemably damaged and therefore not recyclable for a renewed use, but, secondly, with the breaking and fracturing of a part of the container there is the serious risk of contaminating the contents of the container with any particles or fragments generated by the breaking of the portion of the corner of the edge of the container (for example in the case of syringes already containing the pharmaceutical substance and which must be provided only with the activating piston, these fragments or particles might contaminate the pharmaceutical substance if they reach contact therewith or fall directly into the syringes).

SUMMARY OF THE INVENTION

An aim of the present invention is therefore to provide a method and a device actuating the method that are able to obviate the above-described drawbacks present in the prior art.

In particular, an aim of the present invention is to provide a new method for successfully removing the sealing film of a container, also in circumstances and situations in which at the rounded corners of the edges of the container there is a projecting flap of film, significantly curled or folded downwards or a flap of film projecting by a very little amount from the corners.

The aims are obtained with the method for removing the sealing film from a container according to claim 1.

Other advantageous characteristics of the method of the present invention are set down in the various claims dependent on claim 1.

A further aim of the present invention is to provide a gripping device, usable for actuating the method according to claims 1-9, according to claim 10.

BRIEF DESCRIPTION OF THE DRAWINGS

The characteristics of the method for removing the sealing film from a container, and the gripping device usable for actuating the method, provided by the invention, are described in the following with reference to the accompanying tables of drawings, in which:

FIG. 1, already mentioned in the foregoing, schematically illustrates in a lateral view a container with a sealing film applied and sealed for example by heat-welding or gluing to the relative upper edge folded outwards;

FIGS. 3 and 4 illustrated, in a partial view from above, the container with the film to be removed and, schematically, the gripping device in a first operating step of the method for removing the film of the present invention, while FIG. 3A is a view according to section plane of FIG. 3 and FIGS. 4A and 4B illustrated the view along section plane IV-IV of FIG. 4 and illustrate two respective and successive positions assumed by the gripping device and by the relative jaws, with respect to the flap of film projecting from the beveled corner of the container during the performing of a step of the method;

FIG. 5 is a view from above of the container with the gripping device about to be moved according to the steps of the method, while

FIG. 6 illustrates the container from above with the gripping device about to be moved according to the steps of the method, while

FIG. 7 is a view from above of the container with the gripping device moved according to the method, while

FIG. 8 is a view from above of the container with the gripping device moved and activated according to a concluding step of the method of the invention, with the film detaching completely from the edges of the container, while

DESCRIPTION OF PREFERRED EMBODIMENTS

Figure 2:
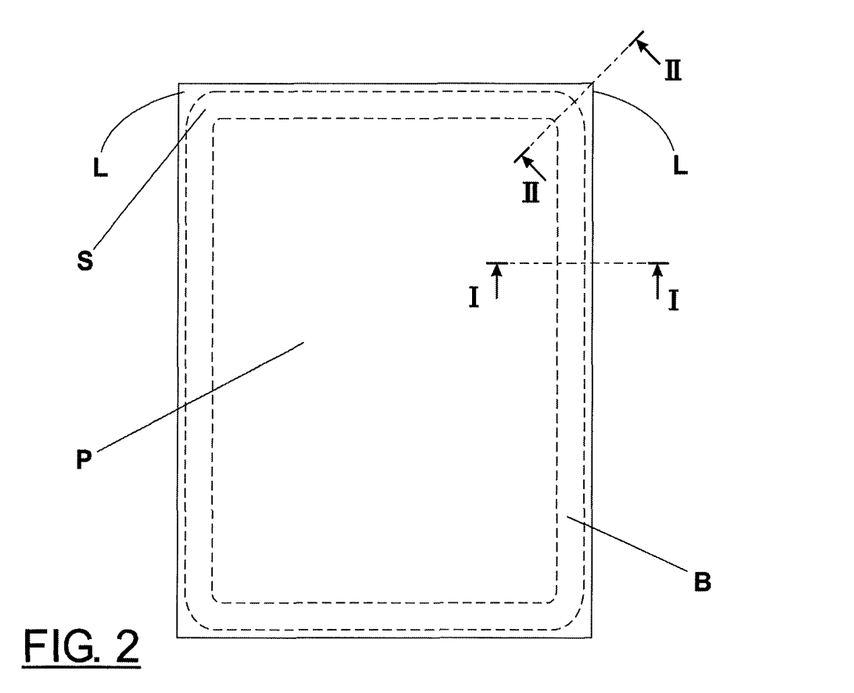
FIG. 2, already mentioned in the foregoing, is a view from above of the container of FIG. 1, where the rounded shape of the corners of the container can be seen, while FIGS. 2A and 2B, also already mentioned above, represent the views along the transversal planes of sections A-A and B-B of FIG. 2, situated respectively in a point along a side of the container and at a rounded corner of the container.
Figure 3:
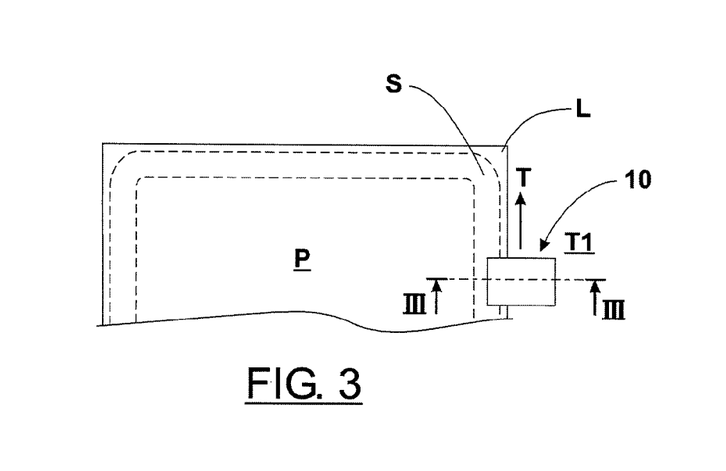
Figure 3A:
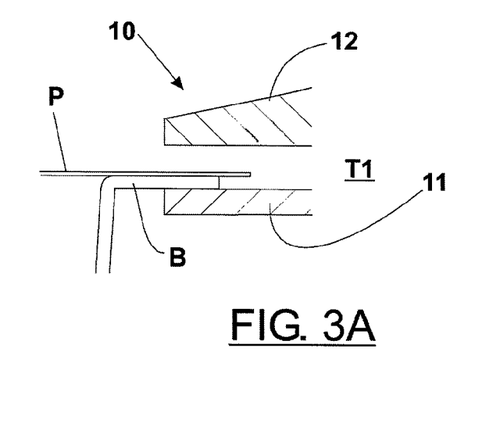

With reference to the accompanying tables of drawings, (10) denotes the gripping device used by the method of the present invention for removing the sealing film (P) of a container (C), as illustrated in FIGS. 1, 2, which sealing film (P) exhibits an upper edge (B) folded towards the outside and profiled and rounded corners (S).

The sealing film (P) is sealed to the container (C) at the upper bent edge (B) of the container (C), for example following a heat-welding process or by gluing, and consequently at the rounded edges (S) there might be a projecting flap (L) of film that is subject to curling and folding downwards (see FIG. 2B), or a flap (L) of film which projects very little (this situation is not illustrated in the figures as it is very easy to intuit).

The method of the present invention has been observed to be particularly effective in both the situations described above.

As mentioned above, the method of the present invention uses a gripping device (10), which is illustrated in detail in FIGS. 9A, 9B, 10A, 10B and will be described in detail in the following, which comprises two gripping jaws (11, 12); a lower gripping jaw (11) and an upper gripping jaw (12), where the lower gripping jaw (11) is fixed while the upper gripping jaw (12) is mobile so as to be both clampable against the lower jaw (11) and distanceable therefrom.

Figure 6:
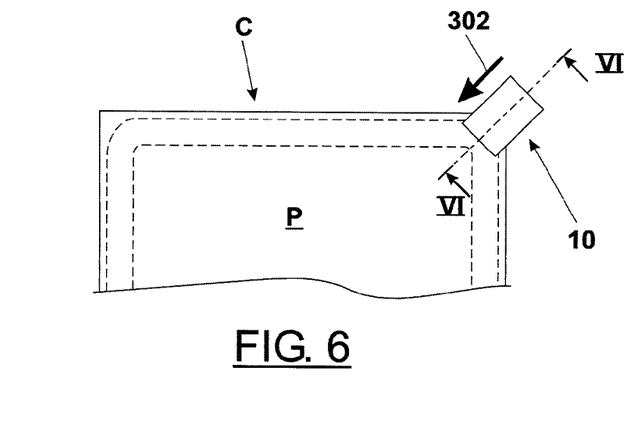
Figure 6A:
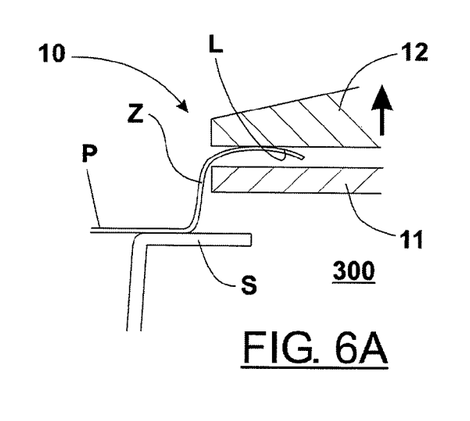
FIGS. 6A, 6B, and 6C illustrate views along section VI-VI of FIG. 6 and illustrate respective and successive activations of the gripping device and the relative jaws during the carrying-out of other steps of the method of the invention.
Figure 6B:
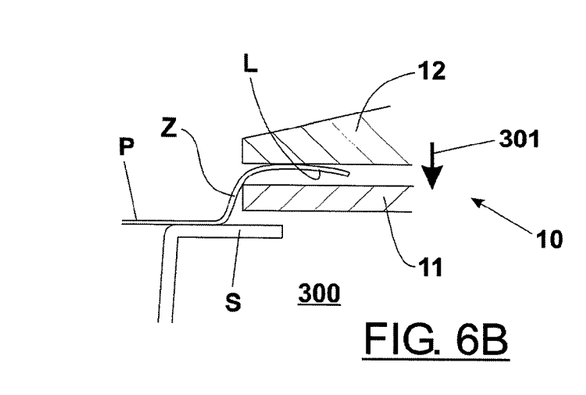
Figure 6C:
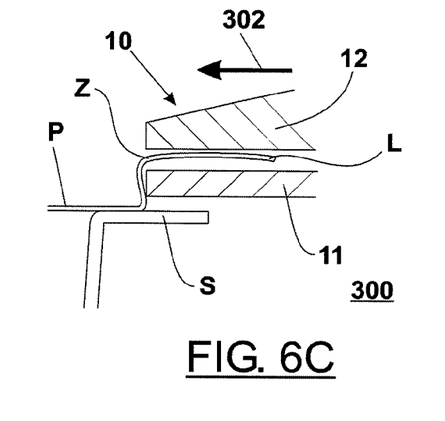
Figure 7B:
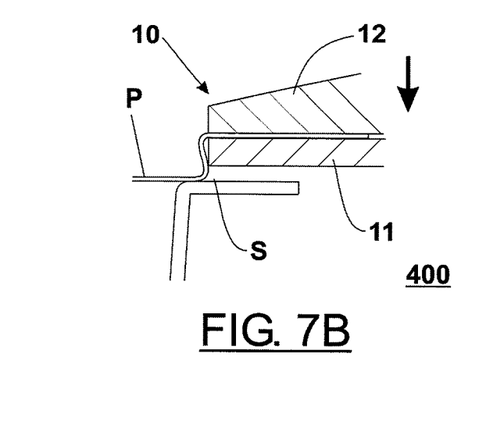
Figure 7C:
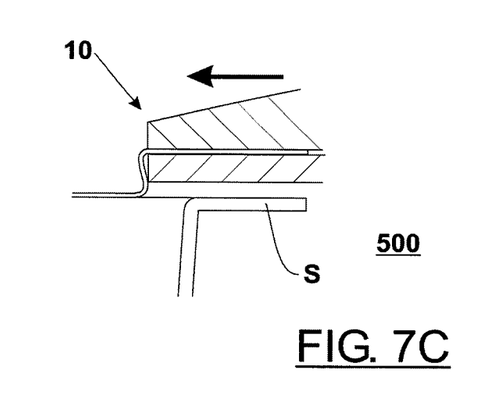
Figure 8:
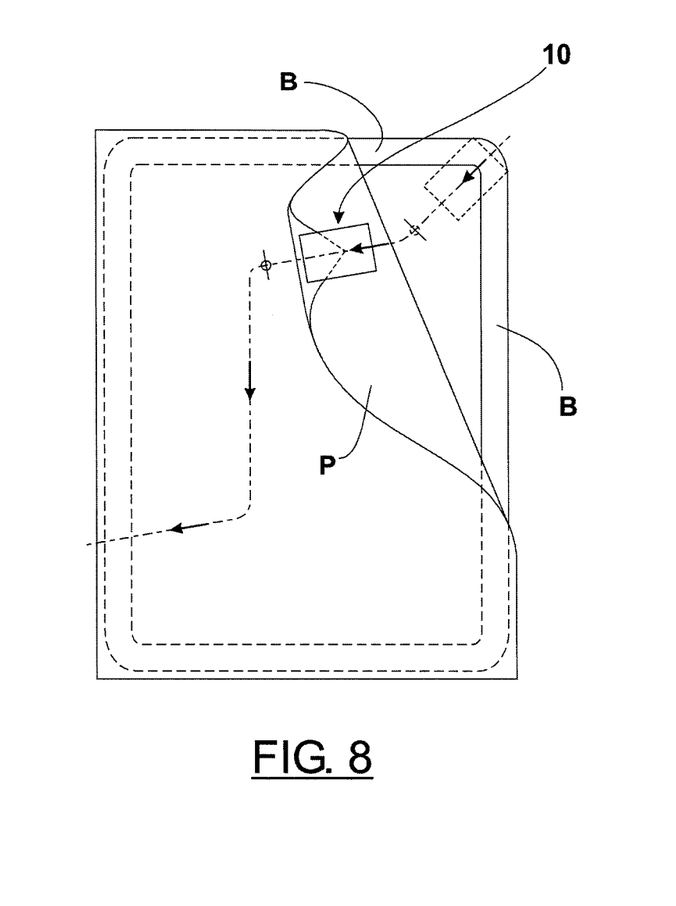
Figure 8A:
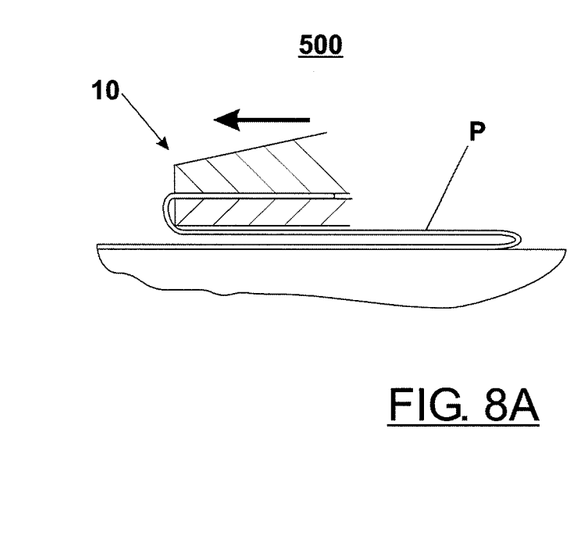
FIG. 8A illustrates, in a transversal section view, the position of the jaws of the gripping device which clamp the film during the movement illustrated in FIG. 8.
Figure 9A:
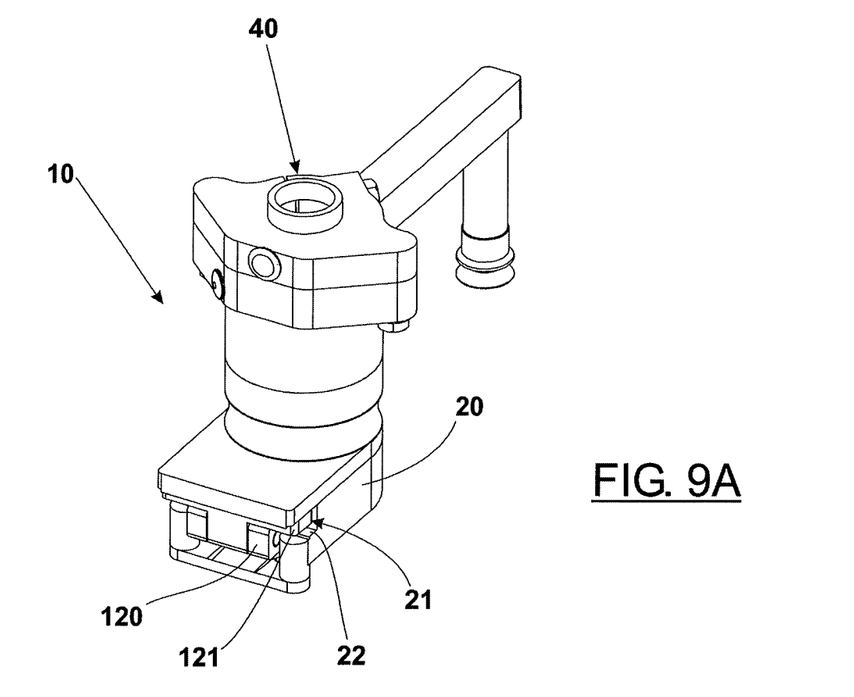
FIGS. 9A and 9B illustrate two distinct views of the gripping device used for carrying-out the method of the invention, respectively in a perspective view from above and a perspective view from below.
Figure 9B:
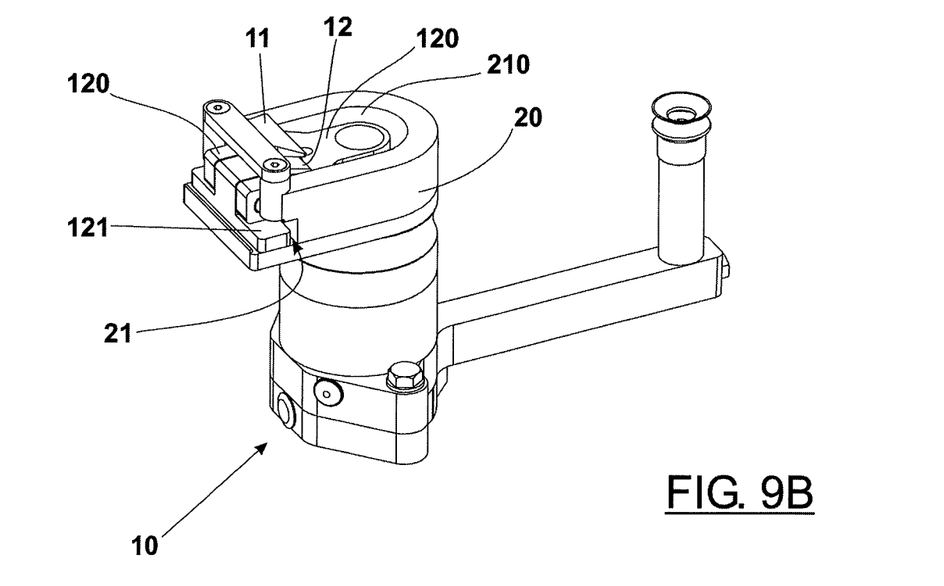

The main characteristics of the method of the invention consist in the fact that the method comprises, one in succession after the other, the following operative steps:

a first gripping step (100) (see for example FIG. 5A), in which the gripping device (10) is moved with respect to the container (C) and activated such that the gripping device (10) can grip between the two jaws (11, 12), once the upper jaw (12) has been clamped against the lower jaw (11), the flap (L) of film (P) projecting from a rounded corner (S) of the container (C);

a step of partial detachment (200) of the film (P) (see for example FIG. 5D), in which the gripping device (10) is activated, with the upper jaw (12) maintained clamped against the lower jaw gripping between them the flap (L) of film, such as to be raised with respect to the rounded corner (S) of the container (C) by a run of an entity which is such as to perform a detachment of only a portion (Z) of the film (P) which is at the rounded corner (S) of the bent edge (B) of the container (C);

a step of adjusting (300) the position of the gripping device (10) with respect to the film (P), in which the gripping device (10) is first activated such that the movable upper jaw (12) is distanced from the fixed lower jaw (11) (see FIG. 6A) and successively activated in such a way as to be moved towards the center of the container (C) such as to capture, between the two jaws (11, 12), also a portion (Z) of the film (P) which has been previously detached from the rounded corner (S), so as between the two jaws (11, 12) there is interposed a surface of film (P) that is larger with respect to the surface of the flap (L) of film which projected from the rounded corner (S) of the edge of the container (see FIGS. 6, 6B, 6C);

a second gripping step (400) (FIG. 7B), in which the gripping device (10) is commanded such that the upper jaw (12) lowers and clamps against the fixed lower jaw (11) in such a way as to clamp this surface of film, and lastly, a step of complete detachment (500) (see FIGS. 7C, 8, 8A), in which the gripping device (10), with the upper jaw (12) maintained clamped against the lower jaw such as to achieve a vice grip of the surface of film (P), is commanded and moved in such a way that the two jaws (11, 12) are raised and distanced from the corner (S) and moved towards the center of the container (C) such as to carry out the complete detachment of the film (P) from all the edge (B) of the container (C).

In this way, thanks to the carrying-out of the step of partial detachment (200) of only a portion (Z) of the film (P) at a part of only the rounded corner (S) of the edge of the container (C), it is certain that the device (10) does not lose grip on the flap (L), as the resistance of this portion (Z) of sealed film only at this part of the corner (S) is very small.

Further, and very advantageously, the fact that after having performed this partial detachment of the film the method includes the step of adjusting (300) the position of the gripping device (10) with respect to the film (P) means that both the portion (Z) of film (P) and the flap (L) of film projecting from the corner (S) can be captured/positioned between the two jaws (11, 12) of the gripping device (10).

This means that a much larger surface of film (P) is between the two jaws (11, 12) of the gripping device (10) than in a case in which the jaws (11, 12) act only on the flap of film which initially projected from the corner (S), as happened for example in the prior art, for example according to what is described in document DE 44 19 475.

The fact of using a gripping device (10) with the fixed lower jaw (11) and the mobile upper jaw (12) prevents, during the course of the initial part of the step of adjusting (300), which includes the distancing of the upper jaw (12) from the lower jaw (11), the flap of film (L) thus freed from lowering and folding in a downwards direction, as it is maintained resting against the fixed lower jaw (11).

Thus, thanks to the carrying-out of the second gripping step (400) according to the present method, where the gripping device (10) is commanded such that the upper jaw (12) lowers and clamps against the fixed lower jaw (11) in such a way as to clamp the surface of the film, it is possible to grip and retain, between the two jaws, a surface of film that is sufficient for the gripping device to maintain the grip and overcome the resistance of the following and final step of complete detachment (500) of the film (P).

Therefore, with the method of the present invention, which includes the specification of carrying out only a partial detachment of the film in only the portion thereof which is at the rounded corner and therefore also the specification of carrying out the adjustment of the position of the gripping device with respect to the film, so that a greater surface of film is between the two jaws, it is possible to remove, with no difficulty, the sealing film also in those cases where the flap of film projects only by a very small amount from the rounded corner, or was very curly or folded in a downwards direction.

Also worthy of note is that thanks to the particular steps of the method of the present invention, it is not even necessary to proceed with the breaking of a part of the edge of the container at the rounded corner, as was the case according to the method described in document WO2007/090690.

Therefore, apart from guaranteeing the certainty of the removal of the film also in the more complicated and difficult cases, the method of the present invention conserves the integrity of the containers, meaning that they can be re-used, and does not include some steps which might risk or compromise the aseptic and sterile packing conditions of the articles contained in the container.

Other advantageous peculiarities of the disclosed method are set out in detail in the following.

According to the method, the step of adjusting (300) the position of the gripping device (10) with respect to the film (P) is carried out in such a way that the displacement of the gripping device (10), with the upper jaw (12) maintained distanced from the lower jaw (11), towards the center of the container (C) is performed first with a slight displacement (301) of the gripping device (10) downwards, without the lower jaw (11) contacting with the rounded corner (S) of the edge (B) of the container (C) (see FIG. 6B in detail), and then with a subsequent translation (302) of the gripping device (10) towards the center of the container (C) (see FIG. 6 and FIG. 6C).

This prevents the flap (L) positioned between the two open jaws (11, 12) from bending backwards towards the center of the container due to the elasticity of the film.

The step of adjusting (300) the position of the gripping device (10) with respect to the film (P) is performed in such a way that the translation (302) of the gripping device (10) towards the center of the container (C) is done in a parallel direction to the bisector of the subtended angle of the rounded corner (S) (see for example FIG. 6).

Figure 7:
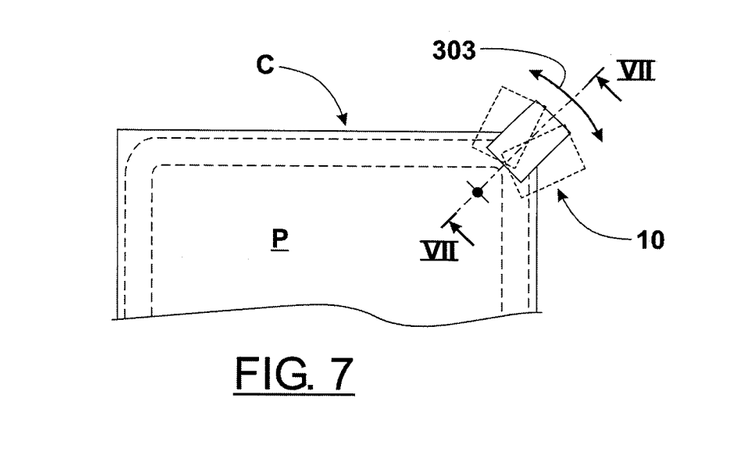
Figure 7A:
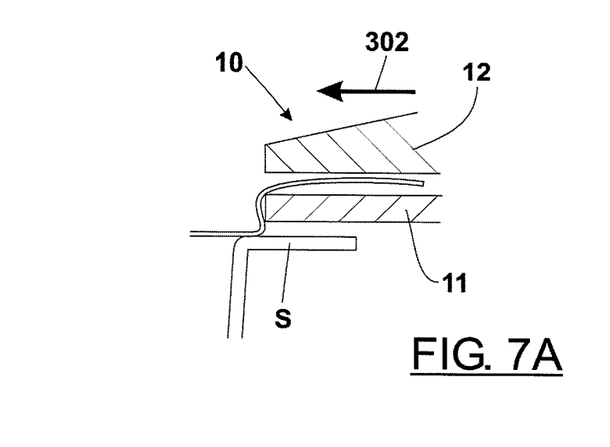
FIGS. 7A, 7B and 7C illustrate the view along section plane VII-VII of FIG. 7 and illustrate respective and successive activations imparted on the gripping device and the relative jaws during the carrying-out of further steps peculiar to the method of the invention.

The step of adjusting (300) of the position of the gripping device (10) with respect to the film (P) can be advantageously performed in such a way that during the translation (302) of the gripping device (10) towards the center of the container (C) in a parallel direction to the bisector of the subtended angle of the corner (S), the gripping device (10) is made to oscillate (303) according to a vertical axis perpendicular to said direction (see in particular FIGS. 7 and 7A).

The particular activating and movement mode enables preventing the parts of the portion (Z) of film, which have just been detached from the corner, and on which the adhesive used for sealing it to the edge of the container, from adhering and attaching to the lower jaw (11), which would compromise the positive outcome of the adjusting step.

Figure 4:
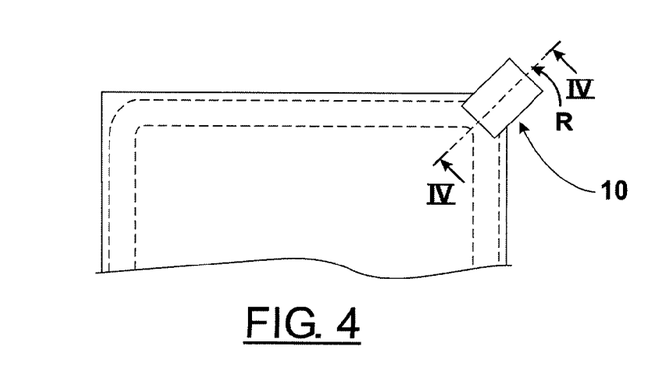
Figure 4A:
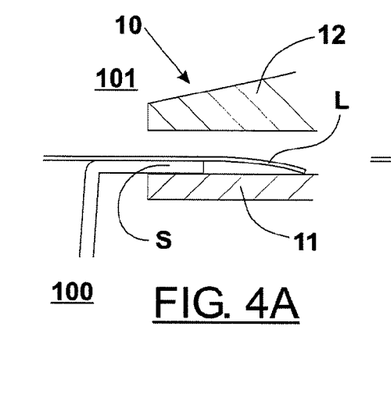
Figure 4B:
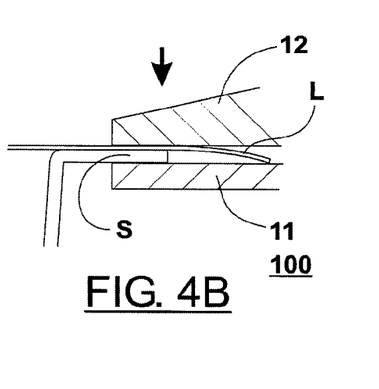

According to the method, the first gripping step (100) is carried out:

first by positioning the gripping device (10), with the two jaws (11, 12) open and with the upper jaw (12) maintained in a distanced position from the lower jaw (11), at the rounded corner (S) of the edge of the container in a position (101) and in a way such that the fixed lower jaw (11) is below the edge (B) of the container and in contact with a part of the lower surface of the rounded corner (S), such that between the two open jaws (11, 12) are interposed both a portion of the rounded corner (S), a portion of the film (P) sealed to the rounded corner portion (S) and the flap (L) of the film (P) projecting from the rounded corner (S) (see FIG. 4A in detail), and then subsequently by commanding the gripping device (10) such that the movable upper jaw (12) lowers towards the lower jaw (11) up to when it contacts the edge (B) of the container such as to grip between the jaws (11, 12) the portion of the rounded corner (S), the portion of the film (P) sealed to the portion of rounded corner (S) and the flap (L) of film (P) projecting from the corner (S) (see FIG. 4B), and then translating (102) the gripping device (10) towards the outside of the container (C) by a run of an entity such that only the flap (L) of film (P) projecting from the corner (S) is clamped between the two jaws (11,12) (see FIG. 5A).

These particular modalities enable the gripping device to grip, between the two jaws, the flap (L) of projecting film both when the flap (L) is projecting by a very small amount and when it is very curled and folded in a downwards direction.

Figure 5:
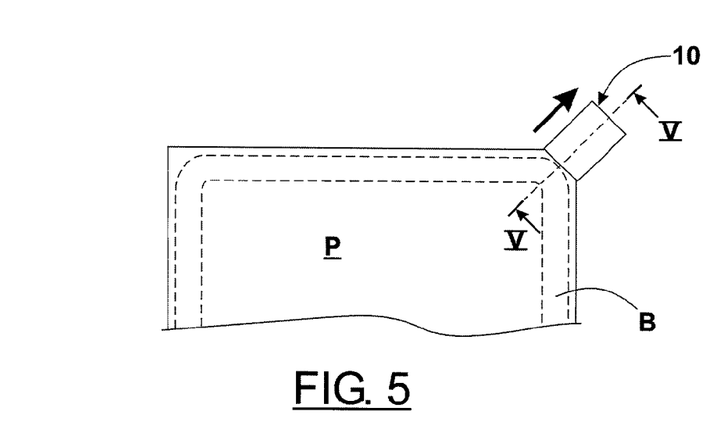
Figure 5A:
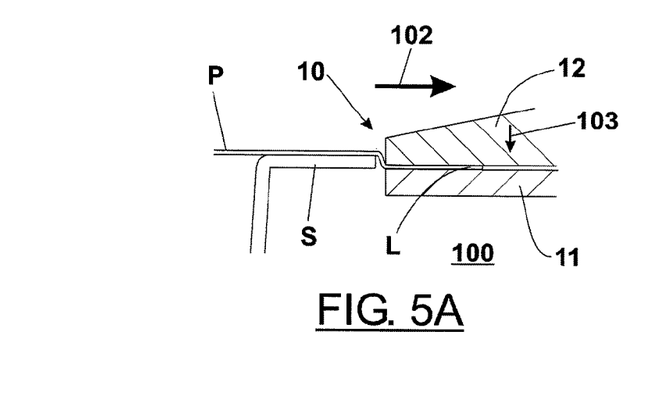
FIGS. 5A, 5B, 5C and 5D illustrate views along section V-V of FIG. 5 and illustrate respective and successive activations of the gripping device and the relative jaws during the carrying-out of other steps of the method of the invention.
Figure 5B:
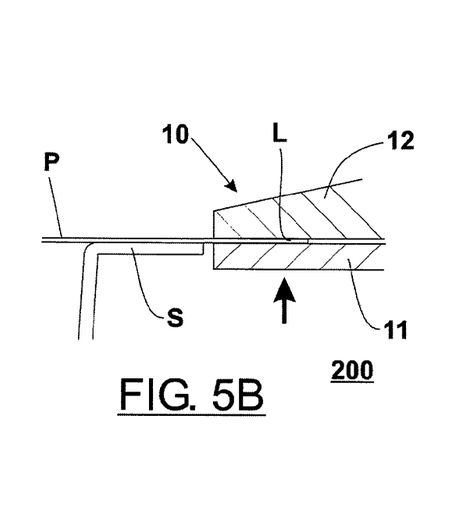
Figures 5C, 5D:
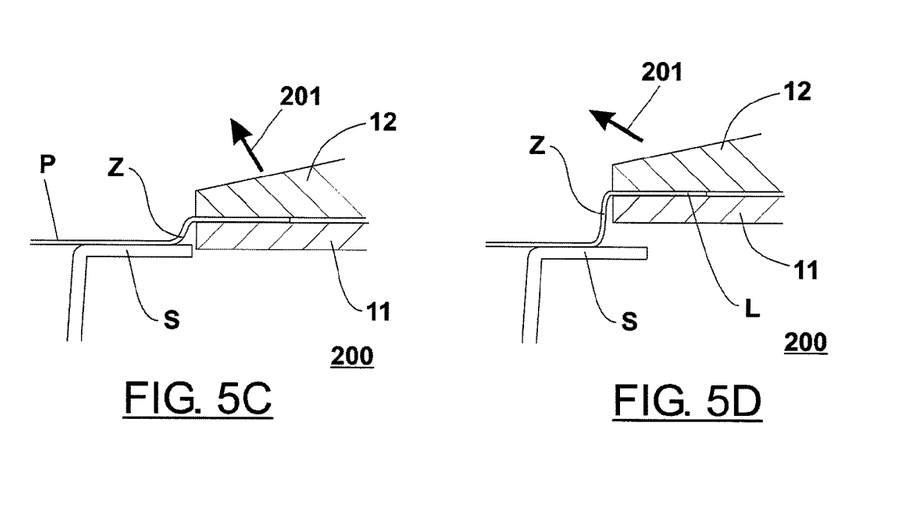

With the aim of guaranteeing being able to grip with certainty the flap between the two jaws of the gripping device, the method comprises that during the first gripping step (100), when the gripping device (10) is translated (102) towards the outside of the container, as soon as the two jaws (11, 12) pass beyond the external end of the rounded corner (S), losing contact with the edge (B) of the container, the upper jaw (12) is immediately clamped (103) further towards the lower jaw (11) such as to more strongly clamp the flap (L) of film projecting from the corner (S), and the translation of the gripping device (10) is then stopped FIG. 5A).

Further, the method can include that for the carrying-out of the first gripping step (100), the positioning of the gripping device (10) with the two jaws (11, 12) open at the rounded corner (S) of the edge of the container is done:

firstly moving the gripping device (10) such as to position it in a position (T1) along a side of the edge (B) of the container (C), converging towards the corner (S), and in proximity of the corner (S), such that the fixed lower jaw (11) is below the edge (B) of the container and in contact with the lower surface thereof, and then by translating (T) the gripping device (10) towards the rounded corner (S) and then rotating (R) the gripping device (10) such that the axis of the two jaws (11, 12) is aligned with the bisector of the subtended angle to the corner (S) in order to bring it and halt it in the said position (101), all of the preceding being carried out while maintaining the lower fixed jaw (11) in constant contact with the lower surface of the edge (B) of the container (C) (see the sequence of FIGS. 3, 3A, 4, 4A).

This particular movement modality of the gripping device enables carrying out a sort of straightening of the flap (L) projecting from the edge (S) when the flap (L) is folded and curled downwards.

The method further includes using a position sensor predisposed on the gripping device (10) able to detect a thickness and position of the edge (B) of the container and the extension of the rounded corner (S), both during the positioning of the gripping device (10) with the fixed lower jaw (11) arranged below the edge (B) of the container (C) and in contact with the lower surface thereof, and during the translation (102) of the gripping device (10) towards the outside of the container (C) with the jaws (11, 12) locked and the consequent halting of the device (10) as soon as the jaws (11, 12) have passed beyond the end of the rounded corner (S), losing contact with the edge (B) of the container.

In fact, thanks to the use of the sensor the translation (102) of the gripping device can be halted in real-time as soon as the two jaws have passed beyond the end of the rounded corner.

Further, thanks to the use of the position sensor with which the effective and real thickness of both the edge of the container and the film can be detected, the opening or closing of the jaws can be commanded and activated optimally.

For example, for the carrying-out of the step of adjustment (300) of the position, the upper jaw (12) can be distanced from the lower fixed jaw (11) only by an amount necessary for creating a maneuvering space between them, entirely to the advantage of the certainty of maintaining the film between the two jaws.

Further, and also during the carrying-out of the adjustment step, it will be possible to lower (302) the gripping device (10) without going into contact with the edge of the container (situations illustrated in FIGS. 6A and 6B).

The position sensor is also particularly useful during the carrying-out of the step of partial detachment (200) of the film (P) from a part of the rounded corner (S) of the edge (B) of the container, with the detachment of a portion (Z) of the film (P) which is located at the rounded corner (S), as this step is performed with a raising movement (201) of the gripping device (10), given by the combination of a vertical raising movement and a translation movement towards the center of the container, by an entity that is such as to perform only a detachment of a portion (Z) of the film which is at the rounded corner (S) of the bent edge (B) of the container, so as not to lose the grip on the film.

The sensor thus enables detecting the rising of the gripping device from the container and this datum can be used so that the amount of raising is within the limits with which the partial detachment of the film can be obtained only at the corner.

The characteristics of the gripping device (10) usable for the carrying-out of the method of the invention are illustrated in detail in FIGS. 9A, 9B, 10A, 10B.

The gripping device (10) comprises a body (20), a first gripping jaw (11) and a second gripping jaw (12).

The first gripping jaw (11) is borne rigidly and fixedly by the body (20) while the second gripping jaw (12) is associated to the body (20) such as to be positioned above the first gripping jaw (11) and in such a way as to be movable with respect to the body (20) and movable alternatively nearingly and distancingly with respect to the first fixed gripping jaw (11) in such a way as to be able to be respectively clamped against the first jaw (11) and distanced therefrom.

The gripping device (10) further comprises activating means (30) of the second movable gripping jaw (12) such as to activate the second jaw (12) to clamp against and alternatively distance from the first fixed gripping jaw (11).

The body (20) of the device comprises attaching means (40) for connection thereof to a movement and command device for moving the gripping device (10) in space and for activating the activating means (30) of the second movable gripping jaw (12).

In greater detail, the body (20) exhibits a cavity (210) and the second gripping jaw (12) is borne by a plate (120) which is arranged in the cavity (120) of the body (20).

Figure 10A:
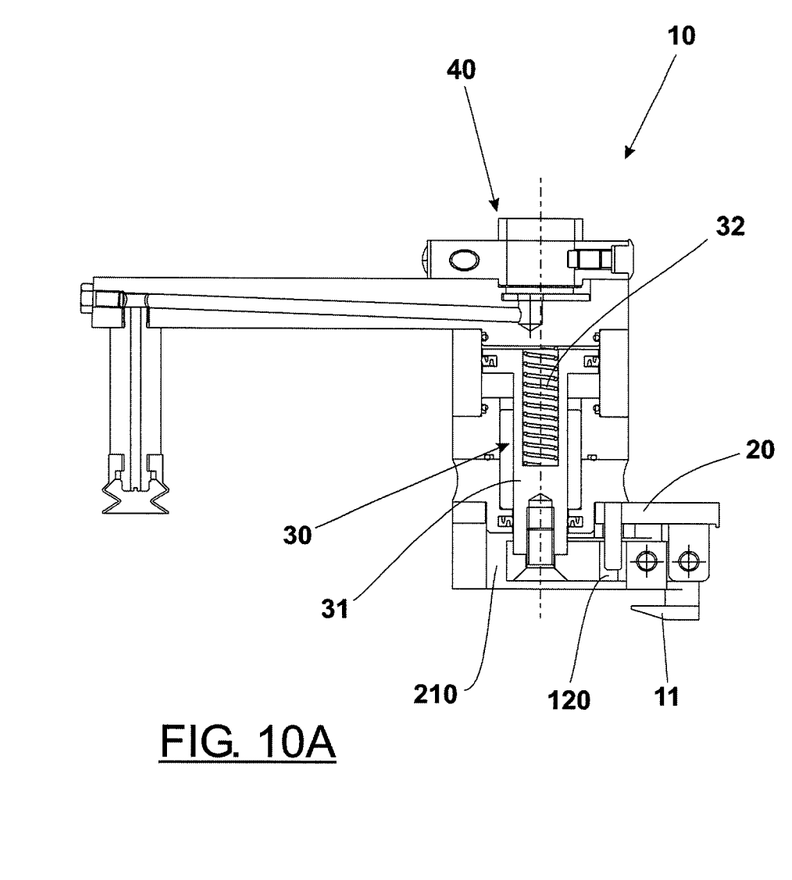
FIGS. 10A and 10B illustrate two distinct views of the gripping device used for carrying-out the method of the invention, respectively in two distinct vertical transversal planes.
Figure 10B:
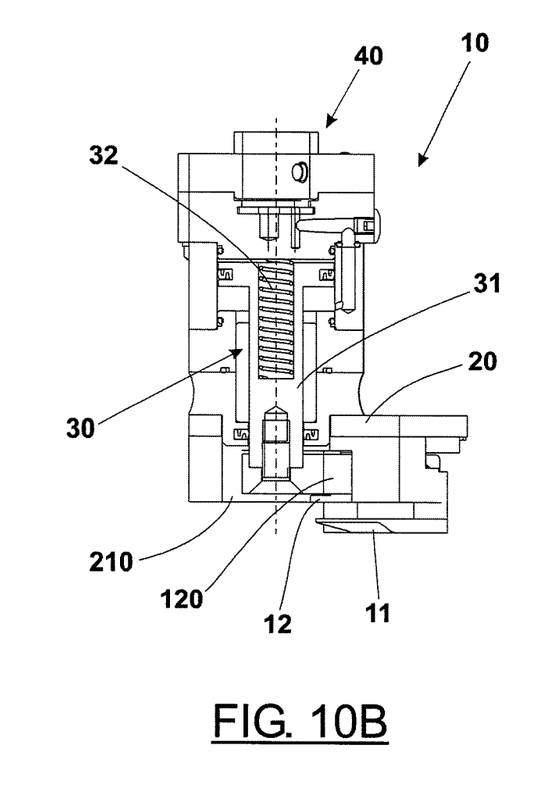

The activating means (30) of the second jaw (12) comprise a piston (31), fixed with a relative end to the plate (120), an elastic organ (32), predisposed in such a way as to exert a thrusting action on the piston (31) such that the piston (31) pushes the plate (120) and therefore the second jaw (12) against the first fixed jaw (11), such as to clamp the two jaws (11, 12) (see for example FIGS. 10A, 10B).

The activating means (30) further comprise an actuator (not illustrated in the accompanying figures) which is activatable by the above-mentioned movement and command device present on the body (20).

Normally the elastic organ (32) maintains the second jaw (12) against the first jaw (11), while the actuator organ is commanded and activated to retract the piston (31), compressing the elastic organ (32) so as to distance the second jaw (12) from the first fixed jaw (11), and thus open the gripping device (10), i.e. open the two jaws (11, 12).

When the actuator organ is deactivated, the elastic organ (32) instantaneously and automatically pushes the plate (120) towards the first jaw (11), and then pushes the second jaw (12) to clamp against the first jaw (11).

Other constructional details of the disclosed gripping device (10) usable for carrying out the method of the invention relate to the fact that the body (20) exhibits a bevel (21) having a shape such as to define an abutment (22) and a plate (121) is provided, hinged rotatably to an end of the plate (120), The plate (120) is arranged in the cavity (210) of the body (20) such that the plate (121) is situated in the bevel (21) of the body (20) and in a position such that when the elastic organ (32) pushes the piston (31) in order to bring the plate (120) and therefore the second movable jaw (12) towards the first fixed jaw (11), the plate (121) strikes contactingly against the abutment (22) on the bevel (21), such as to define a first endrun for the plate (120) with respect to the body (20) and thus define a first gripping position of the two jaws (11, 12) in which the two jaws (11, 12) can clamp there-between both the edge (B) of the container (C) and the film (P) sealed thereon.

Further, thanks to this particular constructional conformation, the plate (121) can further rotate about a part of the abutment (22), with respect to the relative hinging point with the plate (120), such as to enable the elastic organ (32) to push the plate (120), and thus the second jaw (12), further towards the first fixed gripping jaw (11), as soon as the two jaws (11, 12) are translated beyond the rounded corner (S) of the edge (B) of the container (C) such as to define a second gripping position in which the two jaws (11, 12) clamp there-between only the flap of film (L) projecting from the rounded corner (S) of the edge of the container (C).

In this way, the gripping device (10) can particularly effectively perform the delicate first step of gripping (100) of the method, in particular the step of translation (102) (see FIG. 5A) which includes translating the two jaws (11, 12) which are clamped together such as to grip both the thickness of the rounded corner (S) and the film sealed thereof, towards the outside of the container up to passing beyond the external edge of the corner and further clamping together the two jaws as soon as the end is passed.

This enables clamping the flap of film (L) projecting from the corner (S) with certainty, as the further clamping of the upper jaw (12) against the lower jaw (11) is done automatically and instantaneously thanks to the push of the elastic organ (32) as soon as there is no longer the thickness of the corner (S) of the edge (B) of the container (C) between the two jaws (11, 12).

Further, the gripping device (10) is provided with a positioning sensor (not illustrated in the accompanying figures) for detecting the position and thickness of the edge (B) of the container (C) and the extension of the rounded corner (S).

The data obtained by the sensor are then used by the positioning and command device, to which the gripping device (10) is connected, so as to move the device and activate the activating means (30) of the mobile upper jaw (12) in ways and with modalities described herein above during the description of the various steps of carrying out the method of the present invention.

In conclusion, thanks to the method and the gripping device of the present invention, effective and secure removal of the sealing film can be performed from a relative container, including in those more difficult and critical situations in which the flap (L) of film located at the rounded corners (S) of the edge of the container projects only slightly or very little due to a not-optimal centering of the film, or where the edge is very curled and folded in a downwards direction.

The above has been described by way of non-limiting example, and any eventual variations in carrying-out the method and variations thereof that are constructionally equivalent are understood to fall within the scope of the following claims.

The invention claimed is:

1. A method for removing a sealing film from a container, which container exhibits an upper edge bent in an external-wise direction and a polygonal shape having corners of the bent edge that are rounded and with the sealing film sealed to the container at the bent edge and exhibiting flaps projecting from the rounded corners, wherein it comprises use and activation of a gripping device with two gripping jaws, a lower fixed jaw and an upper jaw which is movable in such a way as to be both clamped against the lower jaw and distanced therefrom, and wherein it comprises, in succession one after another, performing following operating steps:
   a first gripping step, in which the gripping device is moved with respect to the container and activated such that the gripping device can grip between the two jaws, once the upper jaw has been clamped against the lower jaw, the flap of film projecting from a rounded corner of the container;
   a step of partial detachment of the film, in which the gripping device is activated, with the upper jaw maintained clamped against the lower jaw gripping between them the flap of film, such as to be raised with respect to the rounded corner of the container by a run of an entity which is such as to perform a detachment of only a portion of the film which is at the rounded corner of the bent edge of the container;
   a step of adjusting the position of the gripping device with respect to the film, in which the gripping device is first activated such that the movable upper jaw is distanced from the fixed lower jaw and successively activated in such a way as to be moved towards the centre of the container such as to capture, between the two jaws, also a portion of the film which has been previously detached from the rounded corner, so as between the two jaws there is interposed a surface of film that is larger with respect to the surface of the flap of film which projected from the rounded corner of the edge of the container;

a second gripping step, in which the gripping device is commanded such that the upper jaw lowers and clamps against the fixed lower jaw in such a way as to clamp this surface of film, and lastly, a step of complete detachment, in which the gripping device, with the upper jaw maintained clamped against the lower jaw such as to achieve a vice grip of the surface of film, is commanded and moved in such a way that the two jaws are raised and distanced from the corner and moved towards the centre of the container such as to carry out the complete detachment of the film from all the edge of the container.

2. The method of claim 1, wherein the step of adjusting the position of the gripping device with respect to the film is carried out in such a way that the displacement of the gripping device, with the upper jaw maintained distanced from the lower jaw, towards the centre of the container is performed first with a slight displacement of the gripping device downwards, without the lower jaw contacting with the rounded corner of the edge of the container, and then with a subsequent translation of the gripping device towards the centre of the container.

3. The method of claim 2, wherein the step of adjusting the position of the gripping device with respect to the film is performed in such a way that the translation of the gripping device towards the centre of the container is done in a parallel direction to the bisector of the subtended angle of the rounded corner.

4. The method of claim 3, wherein the step of adjusting of the position of the gripping device with respect to the film is performed in such a way that during the translation of the gripping device towards the centre of the container in a parallel direction to the bisector of the subtended angle of the corner, the gripping device is made to oscillate according to a vertical axis perpendicular to said direction.

5. The method of claim 4, wherein the first gripping step is performed by positioning the gripping device, with the two jaws open and with the upper jaw maintained in a distanced position from the lower jaw, at the rounded corner of the edge of the container in a position and in a way such that the fixed lower jaw is below the edge of the container and in contact with a part of the lower surface of the rounded corner, such that between the two open jaws are interposed both a portion of the rounded corner, a portion of the film sealed to the rounded corner portion and the flap of the film projecting from the rounded corner, and successively by commanding the gripping device such that the movable upper jaw lowers towards the lower jaw up to when it contacts the edge of the container such as to grip between the jaws the portion of the rounded corner, the portion of the film sealed to the portion of rounded corner and the flap of film projecting from the corner, and then translating the gripping device towards the outside of the container by a run of an entity such that only the flap of film projecting from the corner is clamped between the two jaws.

6. The method of claim 5, wherein when the gripping device is translated towards the outside of the container, as soon as the two jaws pass beyond the external end of the rounded corner, losing contact with the edge of the container, the upper jaw is immediately clamped further towards the lower jaw such as to more strongly clamp the flap of film projecting from the corner, and the translation of the gripping device is then stopped.

7. The method of claim 5, wherein the positioning of the gripping device with the two jaws open at the rounded corner of the edge of the container is done firstly moving the gripping device such as to position it in a position along a side of the edge of the container, converging towards the corner, and in proximity of the corner, such that the fixed lower jaw is below the edge of the container and in contact with the lower surface thereof and successively translating the gripping device towards the rounded corner and then rotating the gripping device such that the axis of the two jaws is aligned with the bisector of the subtended angle to the corner in order to bring it and halt it in the said position, all of the preceding being carried out while maintaining the lower fixed jaw in constant contact with the lower surface of the edge of the container.

8. The method of claim 5, wherein both the positioning of the gripping device with the lower fixed jaw arranged below the edge of the container and in contact with the lower surface thereof, and the translation of the gripping device towards outside the container with the jaws clamped and the consequent halting of the device as soon as the jaws have passed beyond the end of the rounded corner, losing contact with the edge of the container, in order to keep clamped between them only the flap of film projecting from the rounded corner of the edge of the container, and the step of partial detachment of the film and the distancing of the upper jaw from the fixed lower jaw in the step of adjusting the position, are all performed with the aid of a position sensor predisposed on the gripping device able to detect a thickness and position of the edge of the container and the extension of the rounded corner.

9. The method of claim 1, wherein the step of partial detachment of the film from a part of the rounded corner of the edge of the container, with the detachment of a portion of the film which is located at the rounded corner, is performed with a raising movement of the gripping device, with the two jaws maintained clamped such as to clamp the flap of film, given by the combination of a vertical raising movement and a translation movement towards the centre of the container, of an entity that is such as to perform only a detachment of a portion of the film which is at the rounded corner of the bent edge of the container.

* * * * *